March 24, 1959 H. BLACKSTONE ET AL 2,878,712

AIRBORNE SCANNER FOR DETERMINING V/H RATE

Filed Jan. 6, 1955

INVENTORS
HENRY BLACKSTONE
BY FRANK G. WILLEY
Mitchell & Bechert
ATTORNEYS

United States Patent Office 2,878,712

Patented Mar. 24, 1959

2,878,712

AIRBORNE SCANNER FOR DETERMINING V/H RATE

Henry Blackstone, Northport, and Frank G. Willey, Roslyn Heights, N.Y., assignors to Servo Corporation of America, New Hyde Park, N.Y., a corporation of New York Application January 6, 1955, Serial No. 480,254

8 Claims. (Cl. 88—1)

Our invention relates to optical-scanning devices particularly adapted to aerial reconnaissance and like operations, and this application incorporates improvements and modifications over the disclosure in co-pending application Serial No. 444,990, filed July 22, 1954, in the name of Henry Blackstone.

It is an object of the invention to provide an improved device of the character indicated.

It is another object to provide, in conjunction with scanners of the character indicated, means whereby the velocity-altitude function of the aircraft can be readily ascertained.

It is a further object to achieve the above objects with a structure requiring relatively little additional complexity over existing scanners and which may be readily adapted to existing scanners.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, our invention contemplates the application of simplified correlating means to the separate video outputs of two energy-responsive elements spaced in the direction of the flight axis, in scanners of the character indicated. The correlating means includes a visual display which develops a unique presentation upon achievement of correlation between a delayed video output of one energy-responsive element and an undelayed video output of the other energy-responsive element. Adjustment to achieve correlation may be performed manually or automatically, but, in the present arrangements, it is more convenient to perform the operation manually. In one form, the two elements of the energy-responsive means are adjustably displaceable in the sense of the flight axis, so that the angle between the scanning planes of these two elements is correspondingly adjustably variable. In another form, the elements are fixedly spaced, but the delay of one video output with respect to the other is continuously variable. In either case, full scan lines of video intelligence from both energy-responsive elements may be available for continuous correlation. Two methods of visual display are also described.

Figures 1, 2:
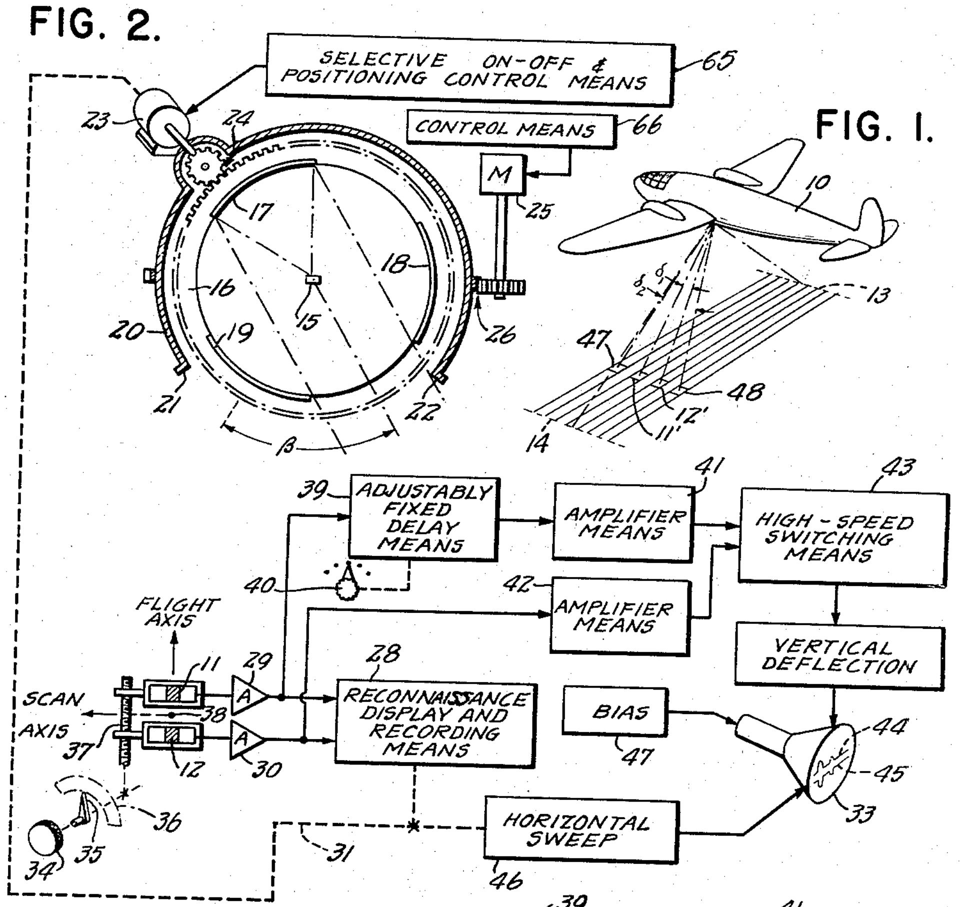
Fig. 1 is a simplified view in three-quarter rear perspective of an aircraft carrying equipment of the invention, and scanning the terrain beneath.
Fig. 2 is a view schematically indicating mechanical, optical and electrical components of a scanner and computer incorporating features of the invention.

Referring to Fig. 1 of the drawings, our invention is shown in application to airborne scanners, such as carried by the aircraft 10, said scanners having a plurality of energy-responsive elements effectively spaced in the direction of the flight axis and including optical means for imaging said elements on the terrain beneath. The images of two such energy-responsive elements 11—12 are shown at 11′—12′ in Fig. 1. The optical means of the scanner may be mounted for continuous movement so as to laterally sweep the images 11′—12′ with respect to the flight axis, as between the limits 13—14 in Fig. 1. For the element spacings determining the images 11′—12′ in Fig. 1, the effective angular separation between elements 11—12 in the sense of the flight axis is designated by the angle $\delta_1$.

The scanner itself may be one of several previously described types, and at the upper left part of Fig. 2 we show basic elements of a scanner described in greater detail in our copending application Serial No. 320,272, filed November 13, 1952. Such a scanner may comprise means, such as cell capsule 15, with a suitably transparent window and supporting the two energy-responsive elements 11—12 on the axis of rotation of a scanner drum 16. In order to provide efficient utilization of the mechanical cycle of the drum 16, we provide a plurality of substantially duplicate optical systems 17—18—19 in equal angularly spaced relation about the drum and carried for rotation therewith. A shield 20 substantially encompasses the scanner drum and optical elements 17—18—19, except for a window or opening defined between limits 21—22.

In the form shown, the optical elements 17—18—19 are mirrors of width substantially equal to the spacing between mirrors, and the arrangement is such with respect to the opening 21—22 that at any one time only one mirror, as, for example, the mirror 17 in Fig. 2, is allowed to collect energy for focus on the elements of cell 15. The angular width of the scan achievable under these circumstances is denoted at $\beta$ in Fig. 2.

To complete the structure, a continuously running motor 23 may drive the drum 16 (as by edge-drive gears 24), and a suitably controlled positioning motor 25 may be connected to the entire scanner and shield 20 (as by edge-drive gears 26) in order to position the entire scanner about a vertical axis, as for adjustment to correct for the instantaneous drift in the heading of the aircraft.

As indicated generally above, our scanner and computer is directly applicable to existing scanning and display devices, as of the reconnaissance type disclosed on our said copending application Serial No. 320,272. For this reason, we merely suggest by the simplified block element 28 in Fig. 2 that the respective outputs of the two elements 11—12 may be separately amplified at 29—30 for direct supply to reconnaissance display and recording means 28, there being of course a suitable synchronizing connection 31 to the continuous scan drive in order to establish a proper reference for the display.

In accordance with the invention, we provide means whereby the velocity-altitude function of the aircraft may be readily determined merely from response to the outputs of the amplifiers 29—30, and, if desired, without in any way affecting the continuous interpretation of the reconnaissance display at 28. In the form shown in Fig. 2, the velocity-altitude function is determined when a coincidence is recognized between the delayed video output of the leading cell element 11 and the undelayed video output of the trailing cell element 12, the delay being fixed and the elements being adjustably positioned with respect to each other. Correlation is observed on a cathode-ray oscillograph display 33.

As indicated, the elements 11—12 are adjustably positionable. In the form shown, we show a manual knob 34, complete with indicating needle 35 and scale 36, for performing this operation. A differential lead screw 37 is connected so as to displace both cells 11—12 in opposite directions and preferably symmetrically with respect to the instantaneous optical axis, designated by the heavy dot 38 in Fig. 2. Adjustment at 34 is accompanied by longitudinal displacement of the images 11'—12', as from the positions shown in Fig. 1 to those shown in like dashed outline at 47—48 (in Fig. 1), for which a greater angular separation $\delta_2$ obtains. Delay of the video output of the leading cell element 11 is provided by adjustably fixed delay means 39 having provision at 40 for manual selection of a number of known delay ranges. Further signal-processing means, such as amplifiers 41—42, may shape the delayed and the undelayed video signals so as to be of generally uniform level when applied to the separate poles of high-speed switching means 43. Switching means 43 may alternately sample the instantaneous outputs of amplifiers 41—42 at a rate very much faster than the scan rate, and preferably of a sampling period less than the spot-travel time across a spot width (during continuous scan).

In the form shown, the visual display at 33 presents two so-called A-score displays 44—45 of opposite polarity, representing the respective outputs of amplifiers 41—42. Thus, switching means 43 preferably incorporates means for oppositely polarizing the sampled outputs of amplifiers 41—42. To complete the A-scope displays at 44—45, the horizontal sweep at 46 may be conventional and synchronized as by means 31 with scan action, while a steady bias source 47 develops a spot of uniform intensity on the display.

In use, a continuous reconnaissance display and record may be available at 28, as disclosed in our said copending application Serial No. 320,272. At the same time, the two A-scope presentations at 44—45 will represent the delayed and the undelayed video outputs of cell elements 11—12, respectively. If these A-scope displays are not substantial images of each other, this fact will be clearly apparent. However, upon selection of the correct delay range at 40, and upon manipulation of the element-spacing means 34, a position will be found for which the A-scope presentations 44—45 are substantial images of each other. These images will represent a full scan line of element 11 video delayed to more or less exactly match a full scan line in the video output of cell element 12. The match, when achieved, will be strikingly apparent and, upon reading needle 35 against scale 36 (with appropriate correction for the setting of knob 40), the v./h. rate of the aircraft is directly and uniquely determined.

Figure 3:
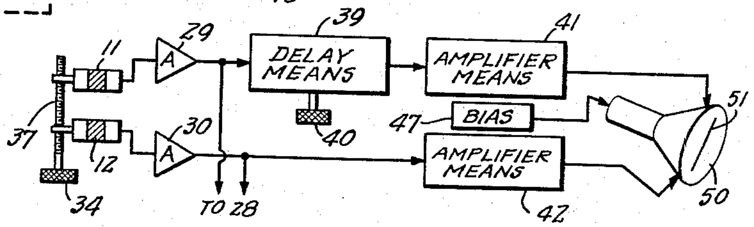
Figs. 3 and 4 are fragmentary views illustrating modifications of certain parts of the arrangement of Fig. 2.

In the arrangement of Fig. 3, we show an alternative display for the mechanical and optical arrangement of Fig. 2. Parts having the same function are, therefore, shown with the same reference characters. In the display of Fig. 3, a cathode-ray oscillograph is again employed at 50, but the continuous output of amplifier 41 is applied to one deflection system while the continuous output of amplifier 42 is applied to the other deflection system. If the adjustment at 34 and 40 in Fig. 3 is such as to provide correlation between the two video outputs of amplifiers 41—42, the spot deflection on the face of display 50 will always be on a straight-line axis, which may be oriented with a slope of substantially 45 degrees to the horizontal, or, rather, intermediate the perpendicular deflection axes to which the outputs or amplifiers 41—42 are respectively connected. In the absence of correlation between these two video outputs, spot development on the display 50 will be at random, and correlation is uniquely identified by the appearance of the straight line 51, at which time, of course, readings of the settings at 34—40 will directly yield the v./h. function of the aircraft.

Figure 4:
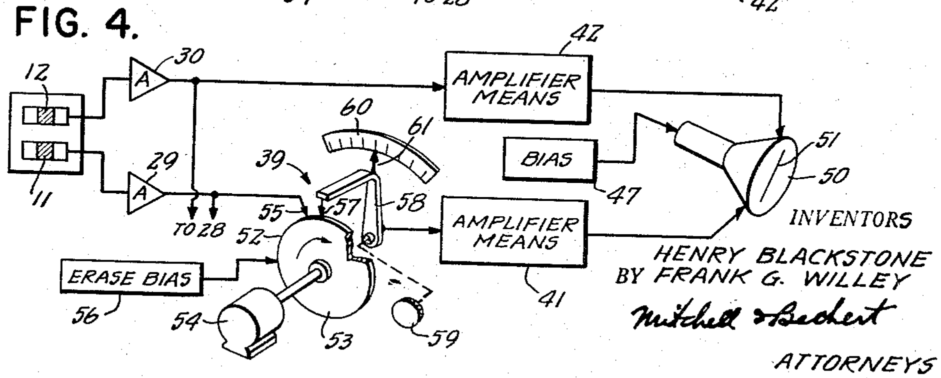

In the modification of Fig. 4, correlation is achieved solely by adjustment of the variable delay of the leading element 11 with respect to the video output of the trailing element 12. The delay means 39 for achieving this result is shown to comprise a continuous circular path of magnetic-storage material, such as a strip of tape 52 carried on the periphery of a disc 53 and continuously driven by motor means 54 at uniform speed. Variable delay may be obtained by using fixed recording and pick-up heads 55—57, and by varying the speed of the drive motor 54; however, in the form shown, the fixed recording head 55 continuously applies the video output of cell element 11 to the tape 52, and the adjustably variable delay is achieved by means of a pick-up element 57 carried on a bracket or arm 58 adjustably manipulable by means 59. Erasing means 56 continuously wipes off the video just prior to application of fresh video at 55, and the scale 60 against which an indicator 61 on arm 58 is to be interpreted may be direct reading in terms of the v./h. function of the aircraft. The display at 50 may be otherwise as described in connection with Fig. 3, so that once correlation is recognized by means of the straight line 51 on the display, the scale reading at 60—61 will directly yield v./h. information.

It will be seen that we have described a relatively simple modification to existing reconnaissance-type scanners and requiring no interruption of presentation of reconnaissance data. The achievement of correlation is readily recognized so that there need be no ambiguity in interpreting the v./h. function. The adjustment to achieve correlation is so simple that, in effect, the v./h. rate is continuously available.

Any one of the described forms of our invention also lends itself to derivation of the drift angle or "crab" of the aircraft. For this purpose, selective on-off and positioning-control means 65 (Fig. 2) associated with the scanner drive may temporarily stop scan action, to position one mirror 17 for a steady downward "look" in the vertical plane of the flight axis. Control means 66 should then be manipulated until the correlation means 33 shows that the delayed and undelayed video signals are the same, at which time the scanner will be able to scan laterally of the true or effective flight axis. This adjustment need only be made occasionally, and, once made, means 65 may be operated to resume the described scanning functions.

While we have described the invention in detail for the preferred forms shown, it will be understood that modifications may be made within the scope of the invention as defined in the claims which follow.

We claim:

1. In combination, a plurality of energy-responsive elements spaced from each other along a longitudinal axis, a scanner including optical means for causing said elements to traverse said axis in a regularly recurrent scanning pattern, means for progressing said elements in the longitudinal direction, whereby said elements are caused to scan longitudinally spaced lines in a field of view for successive operations of said scanner, correlating means including means for delaying the response of one of said elements with respect to that of another of said elements to achieve correlation between said one and said other responses, means for adjustably positioning one of said elements relatively to the other to determine various effective spacings of said elements in the longitudinal sense, whereby, upon identification of the delay necessary to achieve correlation, there may be identified the angular rate at which a given object in the field of view is being longitudinally traversed by longitudinal movement of said elements as aforesaid.

2. In an airborne scanner of the character indicated, two energy-responsive elements spaced in general alignment with the flight axis, optical means for causing said elements to scan laterally of the flight axis, correlating means responsive separately to the outputs of said elements and including means for delaying the output of one of said elements with respect to that of the other, means for adjustably positioning one of said elements relatively to the other to determine various adjusted spacings of said elements in the sense of the flight axis, whereby, upon making the spacing adjustment necessary to achieve correlation, the velocity-altitude function of the aircraft may be directly determined.

3. A scanner according to claim 2, in which said elements are substantially uniformly spaced on opposite sides of the axis of said optical means and in which said adjustable positioning means preserves the symmetry of spacing with respect to said optical axis.

4. In an airborne scanner of the character indicated, two energy-responsive elements spaced in general alignment with the flight axis, optical means for causing said elements to scan laterally of the flight axis, cathode-ray display means, separate signal-processing means for the outputs of said energy-responsive elements, one of said signal-processing means including delay means whereby the video signals of one of said elements may be delayed with respect to the video signal of the other of said elements, first means connecting the output of one of said signal processing means to said display means in a sense to produce a first deflection, and second means connecting the output of the other of said signal processing means to said display means in a sense to produce a different deflection.

5. A scanner according to claim 4, in which said display means includes a cathode-ray oscillograph, the outputs of the respective signal-processing means being connected separately to the respective deflection axes of said oscilograph, whereby a unique display may be developed upon coincidence of the delayed video signal with the undelayed video signal.

6. A scanner according to claim 4, in which said display means includes a cathode-ray oscillograph, sweep means synchronized with scan action and connected for periodical deflection across one axis of said oscillograph, deflection means for a second axis perpendicular to said first axis, said last-defined deflection means including high-speed switching means alternately sampling the respective outputs of said signal-processing means.

7. A scanner according to claim 6, in which said last-defined deflection means includes means applying the sampled output of one of said signal-processing means to said oscillograph with a polarity opposed to the sampled output of the other said signal-processing means.

8. A scanner according to claim 2, in which said delay means includes means for selectively adjusting the delay thereof in predetermined stepped increments, whereby for any given selected position of said delay means a correction factor may be known for proper interpretation of the then relatively small displacement adjustment of said elements.

No references cited.